US006641140B1

(12) United States Patent
Matsumoto et al.

(10) Patent No.: US 6,641,140 B1
(45) Date of Patent: Nov. 4, 2003

(54) APPARATUS FOR RETAINING LUBRICATION OIL AT SLIDING SURFACE OF SHAFT SEAL DEVICE DISPOSED WITHIN OIL CHAMBER OF SUBMERSIBLE PUMP

(75) Inventors: Satoshi Matsumoto, Uji (JP); Minoru Murai, Yawata (JP)

(73) Assignee: Tsurumi Manufacturing Co., Ltd., Osaka (JP)

( * ) Notice: Subject to any disclaimer, the term of this patent is extended or adjusted under 35 U.S.C. 154(b) by 35 days.

(21) Appl. No.: 09/869,291

(22) PCT Filed: Jul. 19, 2000

(86) PCT No.: PCT/JP00/04859

§ 371 (c)(1),
(2), (4) Date: Oct. 15, 2001

(87) PCT Pub. No.: WO02/06709

PCT Pub. Date: Jan. 24, 2002

(51) Int. Cl.[7] ............................. F60J 15/34; F04B 39/02
(52) U.S. Cl. ....................... 277/366; 277/408; 277/512; 415/112
(58) Field of Search ................................. 277/361, 366, 277/375, 408, 512, 514, 430, 930; 415/111, 112, 175, 169.4

(56) References Cited

U.S. PATENT DOCUMENTS

| 2,131,544 | A | * | 9/1938 | Weiland ...................... 277/390 |
| 2,418,194 | A | * | 4/1947 | Piccardo ...................... 277/366 |
| 3,076,412 | A | * | 2/1963 | Harker et al. ............ 415/170.1 |
| 3,136,258 | A | * | 6/1964 | Bood .......................... 417/367 |
| 3,301,191 | A | * | 1/1967 | Warren ........................ 277/366 |
| 3,667,766 | A | * | 6/1972 | Sussmeyer ................... 277/366 |
| 3,741,679 | A | * | 6/1973 | Johnston .................. 415/172.1 |
| 3,778,070 | A | * | 12/1973 | Shimura ...................... 277/348 |
| 4,109,920 | A | * | 8/1978 | Wiese ......................... 277/408 |
| 4,181,475 | A | * | 1/1980 | Stahl .......................... 417/372 |
| 4,421,999 | A | * | 12/1983 | Beavers et al. ............... 310/87 |
| 4,494,758 | A | * | 1/1985 | Carlsson et al. ............. 277/361 |
| 4,979,875 | A | * | 12/1990 | Muller et al. ............ 415/168.1 |
| RE35,909 | E | * | 9/1998 | Fondelius .................... 277/352 |

FOREIGN PATENT DOCUMENTS

| JP | 51-77457 | | 6/1975 |
| JP | 55-19948 | * | 2/1980 |
| JP | 11-44364 | * | 2/1999 |
| JP | 11-63242 | * | 3/1999 |
| JP | 11-63243 | * | 3/1999 |

* cited by examiner

Primary Examiner—Anthony Knight
Assistant Examiner—Alison K. Pickard
(74) Attorney, Agent, or Firm—Oblon, Spivak, McClelland, Maier & Neustadt, P.C.

(57) ABSTRACT

An apparatus for retaining lubrication oil at the sliding surface of a double-type shaft seal device disposed within an oil chamber of a submersible pump. The apparatus prevents lubrication oil from scattering from the center portion of the oil chamber of the submersible pump toward the circumferential wall, and prevents entrapment of air into the lubrication oil through formation of an oil film in the oil outlet, irrespective of variation in rotational speed of the pump shaft, so that the seal apparatus is lubricated and cooled effectively.

2 Claims, 8 Drawing Sheets

FIG. 10

RECORD OF CIRCULATION EFFECTS

DIMENSIONS OF CLEARANCES H1 AND H2 (unit: mm)

| H2 \ H1 | 0.2 | 0.3 | 0.5 | 0.75 | 1.0 | 1.5 | 2.0 | 2.5 | 3.0 | 3.5 | 4.0 |
|---|---|---|---|---|---|---|---|---|---|---|---|
| 0.3 | × | × | × | × | × | × | × | × | × | × | × |
| 0.5 | × | × | △ | △ | △ | △ | △ | △ | △ | △ | × |
| 0.75 | × | △ | △ | △ | ○ | ○ | ○ | △ | △ | △ | × |
| 1.0 | × | △ | ○ | ○ | ○ | ○ | ○ | ○ | ○ | △ | × |
| 1.5 | × | △ | ○ | ○ | ○ | ○ | ○ | ○ | ○ | △ | × |
| 2.0 | × | △ | ○ | ○ | ○ | ○ | ○ | ○ | ○ | △ | × |
| 2.5 | × | △ | ○ | ○ | ○ | ○ | ○ | ○ | ○ | △ | × |
| 3.0 | × | △ | ○ | ○ | ○ | ○ | ○ | ○ | ○ | △ | × |
| 3.5 | × | △ | △ | △ | △ | △ | △ | △ | △ | △ | × |
| 4.0 | × | × | × | × | × | × | × | × | × | × | × |

EVALUATION CRITERIA

| Status of lubrication oil flowing out of clearance $H_1$ | Evaluation |
|---|---|
| ① Lubrication oil flows out uniformly over the entire circumference | ○ |
| ② Lubrication oil does not flow out uniformly over the entire circumference | △ |
| ③ Lubrication oil hardly flows out | × |

APPARATUS FOR RETAINING LUBRICATION OIL AT SLIDING SURFACE OF SHAFT SEAL DEVICE DISPOSED WITHIN OIL CHAMBER OF SUBMERSIBLE PUMP

TECHNICAL FIELD

The present invention relates to a seal mechanism used in a submersible pump and, more particularly, to a lubrication oil retaining apparatus capable of effectively cooling the sliding surface of a shaft seal device disposed within an oil chamber of the seal mechanism.

BACKGROUND ART

In a conventional submersible pump, a seal mechanism is provided between a pump casing and a motor chamber. In general, in consideration of expansion of lubrication oil stemming from heating-up of the sliding surface of a shaft seal device and heating-up of a motor during rotation, lubrication oil is charged into the oil chamber of the seal mechanism in an amount such that the lubrication oil occupies 80% the overall volume of the oil chamber and thus air-reserving space is formed at the upper portion of the oil chamber.

However, when the shaft seal device is rotated, the lubrication oil flows in a vortex toward the inner circumferential wall of the oil chamber due to centrifugal force generated by the rotation of the shaft seal device, and an air-reserving space is formed at the center portion of the oil chamber. As a result, the sliding surface of the shaft seal device to be lubricated comes into an unimmersed state, resulting in deterioration of the function for lubricating and cooling the sliding surface.

In view of the foregoing, a structure as shown in FIGS. 7 to 9 has been proposed as a measure for maintaining lubrication at the sliding surface of the shaft seal device.

The proposed structure will be described. A cylindrical wall member 110 is disposed to surround a shaft seal device 111. Baffle plates P for directing the flow of oil toward the center axis are disposed on the inner circumferential surface of the cylindrical wall member 110. The lower end portion of the cylindrical wall member 110 is separated from a pump-side housing 102a in order to form an oil inlet 113b along the entire circumference of the lower edge, to thereby establish communication with an oil chamber 103. The upper end portion of the cylindrical wall member 110 is fixed to the lower surface of a motor-side housing 101a. A plurality of oil outlets 113a are formed in the cylindrical wall member 110 at appropriate positions above a sliding surface 112a between an upper mating ring 105a and a seal ring 106a.

However, the results of an experiment show that when the above-described structure in which the oil inlet 113b for communication with the oil chamber 103 is formed by the entire circumference of the lower edge of the cylindrical wall member 110, centrifugal force is produced in the vicinity of the oil inlet 113b due to rotation of the double-type shaft seal device 111, so that lubrication oil within the cylindrical wall member 110 is forced to the outside, thereby greatly hindering the action of sucking and pushing the lubrication oil up.

Furthermore, employment of the above-described structure provides negative effects such that the lubrication oil scatters outward from the plurality of oil outlets 113a formed in the upper portion of the cylindrical wall member 110, with the result that the sliding surface 112a between the upper mating ring 105a and the seal ring 106a is not immersed in the lubrication oil. In addition, the scattered oil tends to entrap air in an air-reserving space 115 above an oil surface 114.

Moreover, since the amount of the lubrication oil flowing out of each oil outlet 113a changes depending on position, air is taken into the cylindrical wall member 110 via an oil outlet 113a from which a smaller amount of oil flows as compared with the remaining oil outlets 113a. This taken air, together with the action of the baffle plates P for directing oil toward the center axis against the above-described centrifugal force, hinders circulation of the lubrication oil within the cylindrical wall member 110, due to its stirring action. In addition, the lubrication oil and the air are intermixed, and thus fine bubbles are generated. As a result, a mixture of the oil and air reaches the sliding surface 112a between the upper mating ring 105a and the seal ring 106a, resulting in a decrease in the lubricating effect. Further, the flow of the lubrication oil between the inside and outside of the cylindrical wall member 110 becomes turbulent, and this turbulent flow of the lubrication oil, together with the mixing of the lubrication oil and air, drastically reduces the efficiency in cooling the sliding surface 112a.

Moreover, although the size and number of the oil outlets 113a must be matched with the rotational speed of a pump shaft 104, in actuality, varying the size and number of the oil outlets 113a in accordance with variation in the rotational speed is impossible at a site where the submersible pump is used.

An object of the present invention is to provide a lubrication oil retaining apparatus for a submersible pump, which apparatus prevents lubrication oil from scattering from the center portion of the oil chamber of a seal mechanism toward the circumferential wall, and which circulates the lubrication oil smoothly to thereby effectively lubricate and cool the sliding surface of the shaft seal device, irrespective of variation in rotational speed of a pump shaft and without causing the entrapment of air into the lubrication oil.

DISCLOSURE OF THE INVENTION

The present invention provides an apparatus for retaining lubrication oil at the sliding surface of a shaft seal device disposed within an oil chamber of a submersible pump. Within the oil chamber located between a motor chamber and a pump chamber, an upper mating ring of a double-type shaft seal device is fitted into an annular groove formed on the lower surface of a motor-side housing, and a lower mating ring of the double-type shaft seal device is fitted into an annular groove formed on the upper surface of a pump-side housing. An annular holding plate for preventing rotation of the lower mating ring is fixed to the upper surface of a circumferential wall surrounding the annular groove. A cylindrical wall member is disposed to surround the double-type shaft seal device. A guide vane is fixed to the inner circumferential surface of the cylindrical wall member, the guide member having a slanted surface that inclines upward toward the rotational direction of a pump shaft. An outwardly-projecting lower edge flange is provided at the lower edge of the cylindrical wall member and fixed to the upper surface of the holding plate. A lateral hole serving as an oil inlet and establishing communication between the back side of a lower end portion of the guide vane and the oil chamber is formed in the lower portion of the cylindrical wall member. An inwardly-projecting flange is provided at the upper edge of the cylindrical wall member located above a sliding surface between the upper mating ring and a seal ring, such that the flange is in close proximity to the motor-side housing. An oil outlet is formed between the upper surface of the flange and the lower surface of a circumferential wall which surrounds the annular groove into which the upper mating ring is fitted. Preferably, the clearance between the upper surface of the flange provided at the upper edge of the cylindrical wall member and the lower surface of the circumferential wall which surrounds the annular groove into which the upper mating ring is fitted is set to fall within a range of about 0.5 mm to 3 mm; and the clearance between the inner circumferential surface of the flange provided at the upper edge of the cylindrical wall member and the outer circumferential surface of the upper seal ring is set to fall within a range of about 1 mm to 3 mm.

Preferably, a guide plate is provided at the oil inlet or the oil outlet, which is an annular clearance, in order to improve the lubrication and cooling action.

BRIEF DESCRIPTION OF THE DRAWINGS

FIG. 10 shows the results of an experiment which was performed in order to evaluate circulation of lubrication oil in the apparatus of the present invention, while dimensions $H_1$ and $H_2$ of main clearances were varied.

BEST MODE FOR CARRYING OUT THE INVENTION

The present invention will now be described on the basis of an embodiment and with reference to FIGS. 1 to 6.

Figure 1:
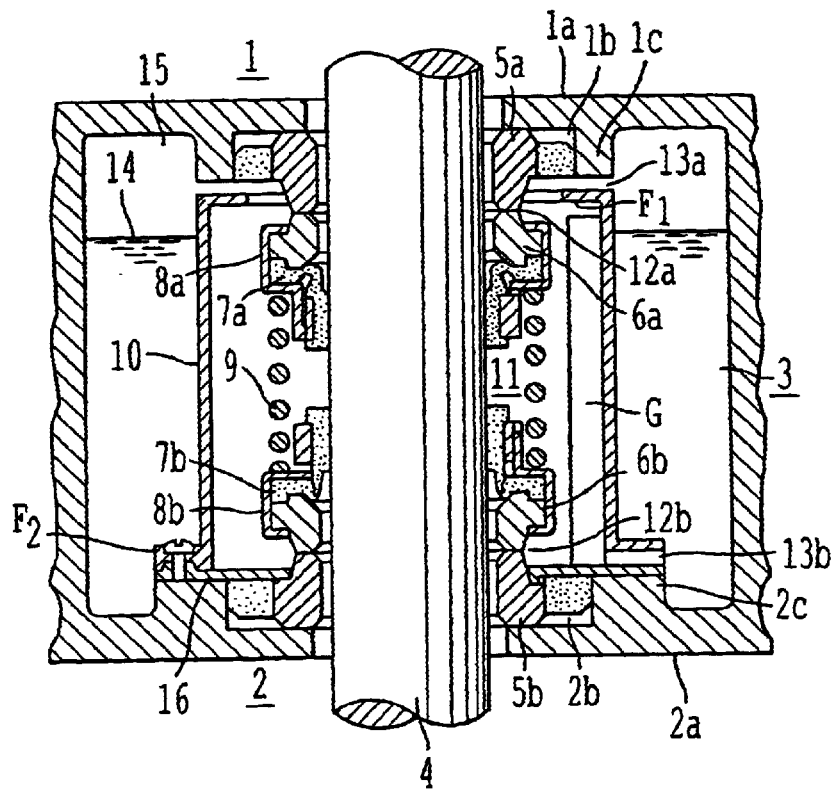
FIG. 1 is a vertical cross-sectional side view of an oil chamber of a submersible pump to which the apparatus according to the present invention is applied.
Figure 4:
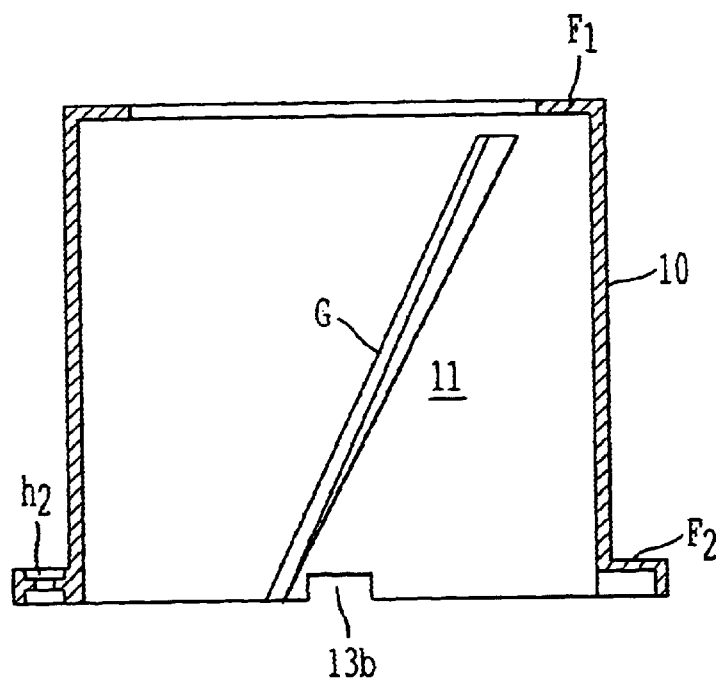
FIG. 4 is a vertical cross-sectional side view of a cylindrical wall member used in the apparatus of the present invention.
Figure 2:
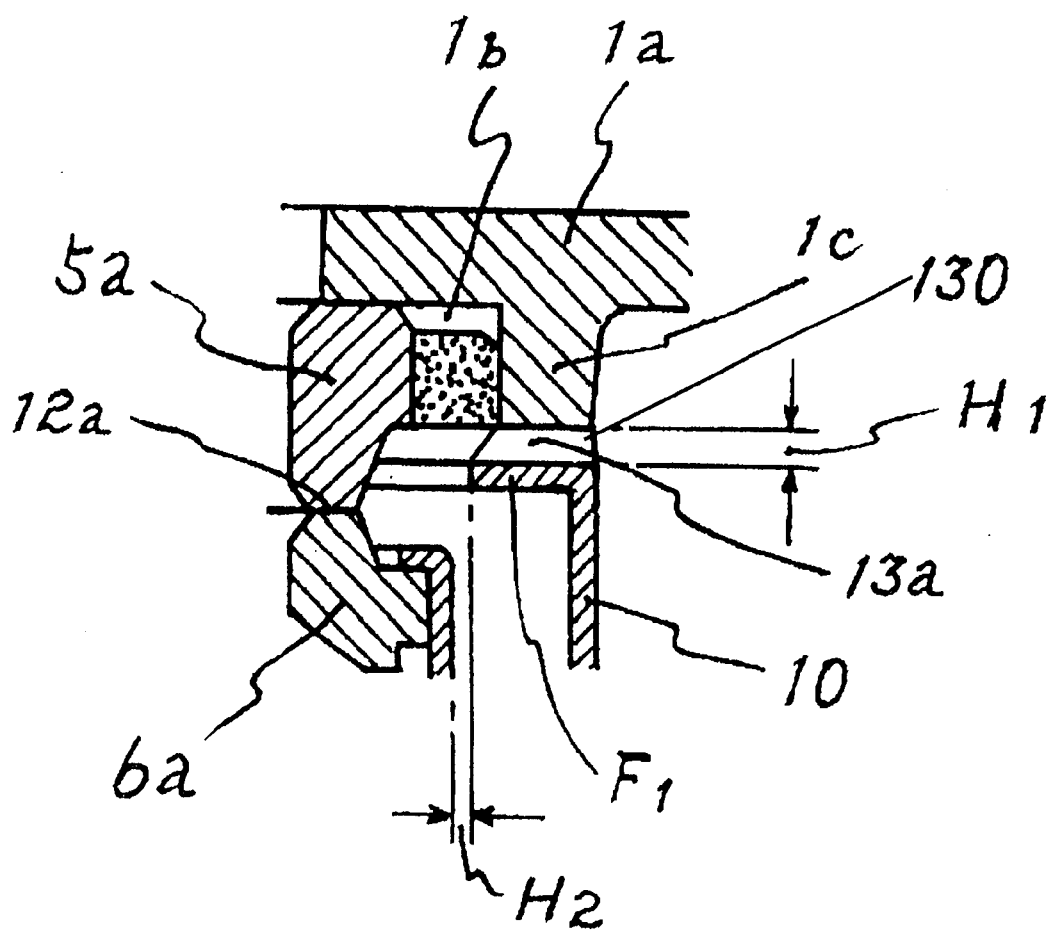
FIG. 2 is an enlarged view showing an upper sliding surface and an oil outlet portion of FIG. 1.

FIG. 1 shows an oil chamber 3 of a mechanical seal of a seal mechanism of a submersible pump according to the embodiment of the present invention.

The oil chamber 3 is provided between a motor chamber 1 and a pump chamber 2. A pump shaft 4 extending from the motor chamber 1 penetrates the oil chamber 3 in order to enter the pump chamber 2. On the upper side of the oil chamber 3, a motor-side housing 1a is provided. A circumferential wall 1c is provided on the housing 1a in order to define an annular groove 1b.

On the lower side of the oil chamber 3, a pump-side housing 2a is provided. A circumferential wall 2c is provided on the housing 2a in order to define an annular groove 2b on the upper surface of the housing 2a.

Upper and lower mating rings 5a and 5b are provided in the following manner.

The upper mating ring 5a receives the pump shaft 4 within the oil chamber 3 with a clearance formed therebetween and is fitted into the annular groove 2b of the motor-side housing 1a.

The lower mating ring 5b receives the pump shaft 4 within the oil chamber 3 with a clearance formed therebetween and is fitted into the annular groove 2b of the pump-side housing 2a.

Figure 3:
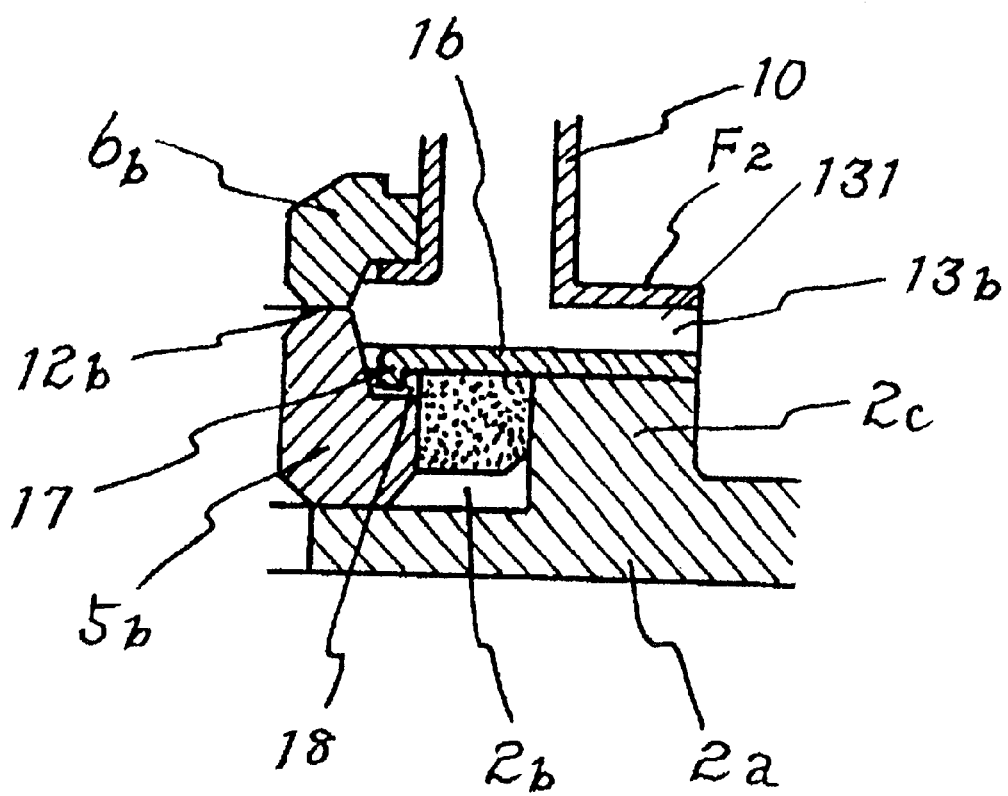
FIG. 3 is an enlarged view showing a lower sliding surface and an oil inlet portion of FIG. 1.
Figure 5:
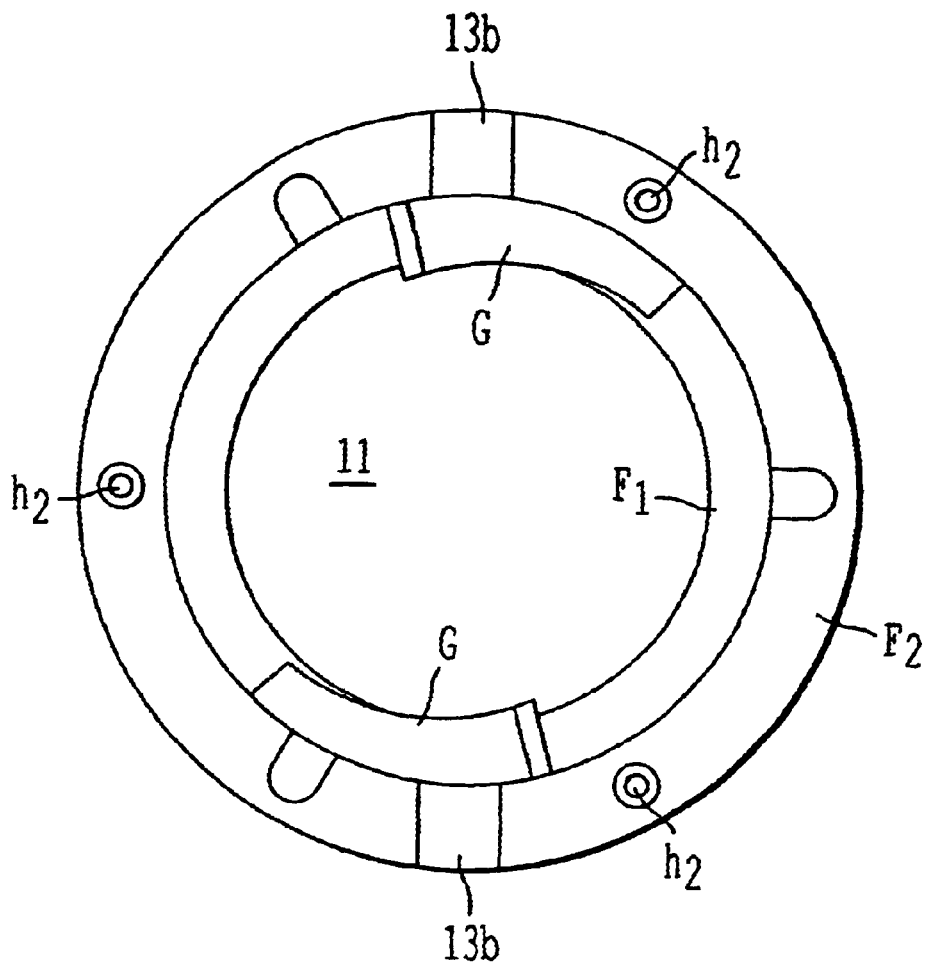
FIG. 5 is a bottom view of the cylindrical wall member used in the apparatus of the present invention.
Figure 6:
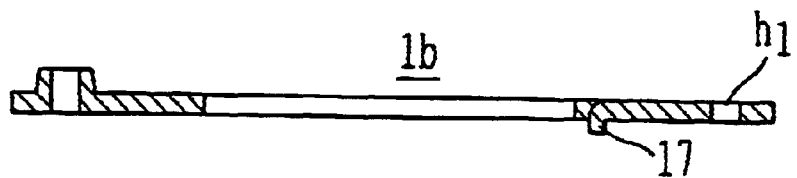
FIG. 6 is a vertical cross-sectional side view of an annular holding plate used in the apparatus of the present invention.
Figure 7:
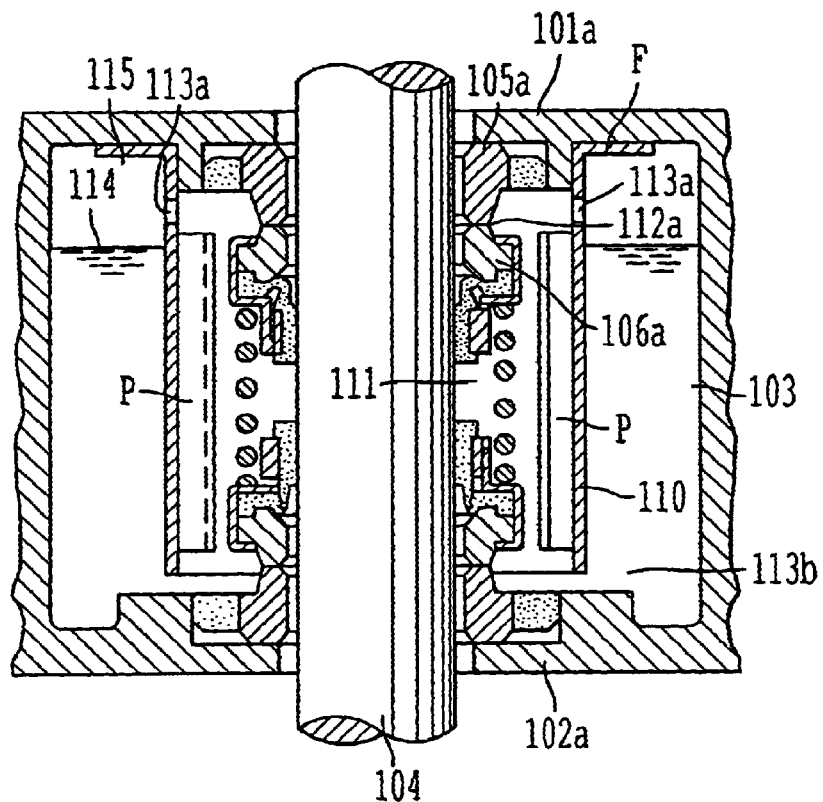
FIG. 7 is a vertical cross-sectional side view of an oil chamber of a conventional submersible pump.
Figure 8:
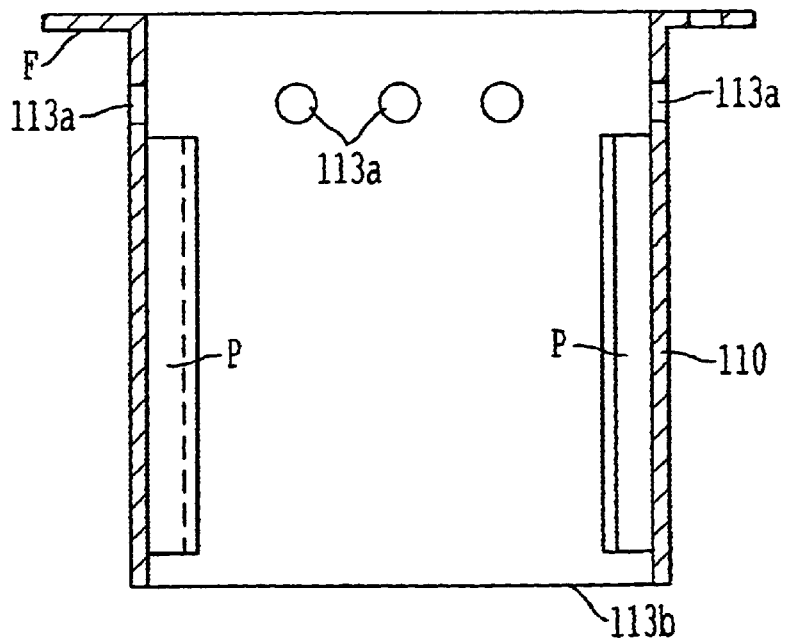
FIG. 8 is a vertical cross-sectional side view of a cylindrical wall member disposed within the oil chamber of the conventional submersible pump.
Figure 9:
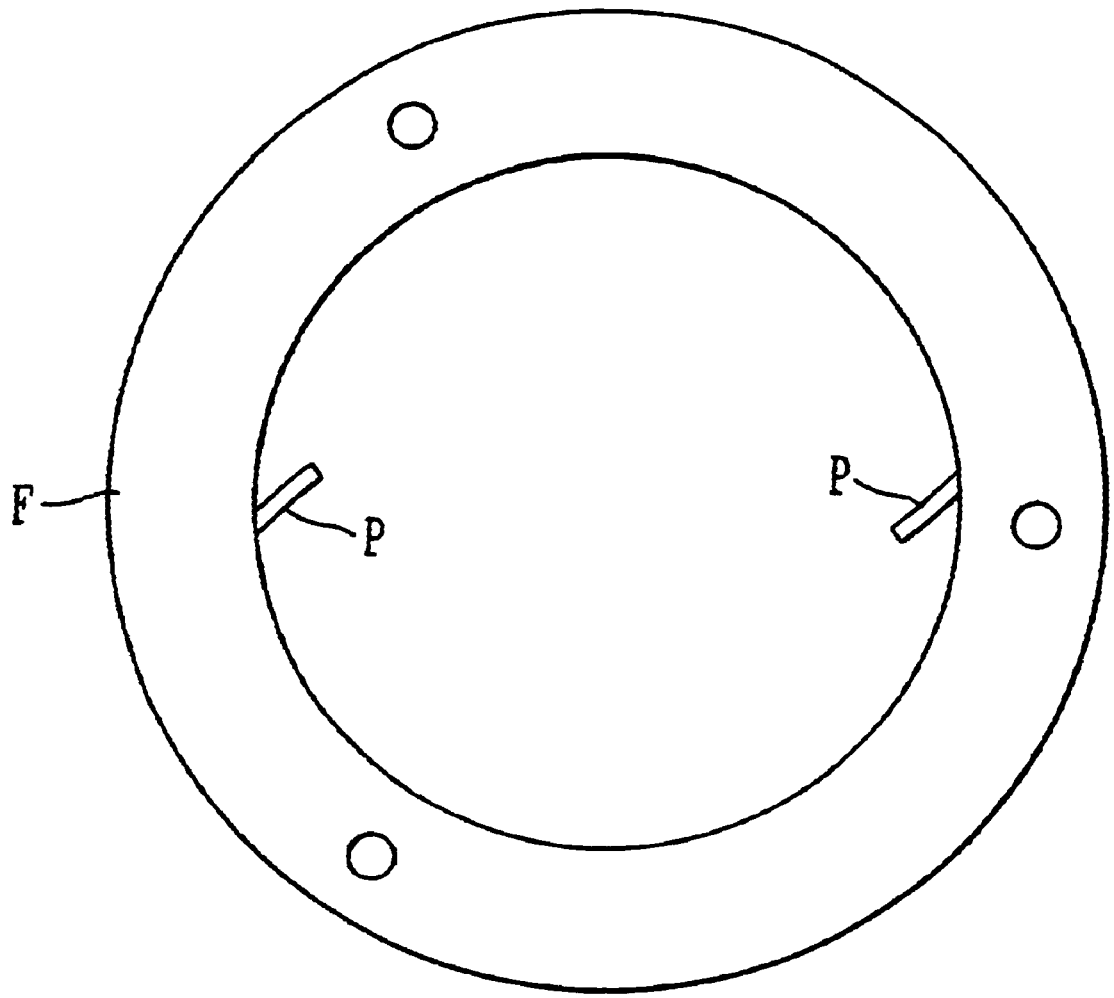
FIG. 9 is a plan view of the cylindrical wall member disposed within the oil chamber of the conventional a submersible pump.

As shown in FIG. 3, a whirl-stop annular plate 1b including a hole h1 (shown in FIG. 6) is provided in order to prevent rotation of the mating ring 5b. The annular plate 1b has an engagement claw 17 which is bent downward through press work. The annular plate 1b is fixed to the upper surface of the circumferential wall 2c in a state in which the engagement claw 17 is engaged with a notch 18 formed on the upper surface of the lower mating ring 5b.

An upper seal ring 6a is in sliding contact with the upper mating ring 5a; and a lower seal ring 6b is in sliding contact with the lower mating ring 5b.

A bellows 7a is supported to extend from the back face of the upper seal ring 6a; and a bellows 7b is supported to extend from the back face of the lower seal ring 6b.

An upper retainer 8a is fitted onto the outer circumference of the upper seal ring 6a and the outer circumference of the bellows 7a in order to integrally join the upper seal ring 6a and the bellows 7a.

A lower retainer 8b is fitted onto the outer circumference of the lower seal ring 6b and the outer circumference of the bellows 7b in order to integrally join the lower seal ring 6b and the bellows 7b.

A compressed coil spring 9 is disposed between the back faces of the upper and lower seal rings 6a and 6b via the upper and lower retainers 8a and 8b. The coil spring 9 is wound in a direction opposite the rotational direction of the pump shaft 4.

A cylindrical wall member 10 is disposed within the oil chamber 3 in order to surround a double-type shaft seal device 11 having the above-described structure. Two guide vanes G are fixed to the inner circumferential surface of the cylindrical wall member 10. Each of the guide vanes G has a slanted surface that inclines upward in the rotational direction of the pump shaft 4.

An outwardly-projecting flange F2 having holes h2 (shown in FIGS. 4 and 5) is provided at the lower edge of the cylindrical wall member 10; and the lower surface of the flange F2 is fixed to the upper surface of the annular holding plate 16. Oil inlets 13b are formed such that each of the oil inlets 13b extends from a position near the back face of the lower end portion of the corresponding guide vane G and communicates with the oil chamber 3 located outside the cylindrical wall member 10.

An inwardly-projecting flange F1 for preventing air-catching is provided at the upper edge of the cylindrical wall member 10 above a sliding surface 12a between the upper mating ring 5a and the seal ring 6a, such that the flange F1 is in close proximity to the motor-side housing 1a.

An oil outlet 13a is formed between the upper surface of the flange F1 and the lower surface of the circumferential wall 1c. The clearance $H_1$ between the upper surface of the flange F1 and the lower surface of the circumferential wall 1c is adjusted to fall within a range of about 0.5 mm to 3 mm. Thus, oil film is easily formed within the annular clearance or the oil outlet 13a. Further, the clearance $H_2$ between the inner circumferential surface of the flange F1 and the outer circumferential surface of the upper seal ring 6a is set to fall within a range of about 1 mm to 3 mm. Thus, the guide vanes G effectively provide an action of pushing the lubrication oil up, and the lubrication oil is smoothly introduced to the upper sliding surface 12a.

The lubrication oil is charged into the oil chamber 3 in an amount such that the lubrication oil occupies 80% the overall volume of the oil chamber 3 and thus an air-reserving space 15 is formed above an oil surface 14.

When the pump is operated, due to rotation of the pump shaft 4, the coil spring 9 disposed between the back surfaces of the upper and lower seal rings 6a and 6b also rotates within the cylindrical wall member 10. As a result, the lubrication oil within the oil chamber 3 located outside the cylindrical wall member 10 flows into the cylindrical wall member 10 via the oil inlets 13b, whereby the lubrication oil lubricates the lower sliding surface 12b and absorbs the sliding heat generated at the sliding surface 12b. Subsequently, the lubrication oil is forced to flow upward along the slanted surfaces of the guide vanes G, and then forced to move toward the center axis along the back face of the air-catching prevention flange F1 to thereby lubricate the upper sliding surface 12a and absorb the sliding heat generated at the sliding surface 12a. Subsequently, the lubrication oil flows from the inner circumferential edge of the flange F1 to the oil outlet 13a.

Within the oil outlet 13a, the lubrication oil forms an oil film due to surface tension to thereby prevent entry of air and is then transferred to the oil chamber 3 outside the cylindrical wall member 10. Since the oil outlet 13a is formed by means of the annular upper surface of the flange F1 and the annular lower surface of the annular wall 1c, which face each other, catching of air is prevented through formation of an oil film, and the lubrication oil retaining apparatus functions effectively, irrespective of variation in rotational speed of the pump shaft 4.

When the clearance $H_1$ is set to fall within the range of about 0.5 mm to 3 mm, the above-described effect can be enhanced further. When the clearance $H_2$ between the inner circumferential surface of the flange F1 and the outer circumferential surface of the upper seal ring 6a is set to fall within the range of about 1 mm to 3 mm, circulation of oil by means of the guide vanes G is performed more efficiently, and the lubrication oil is introduced to the upper sliding surface 12a smoothly.

Figure 11:
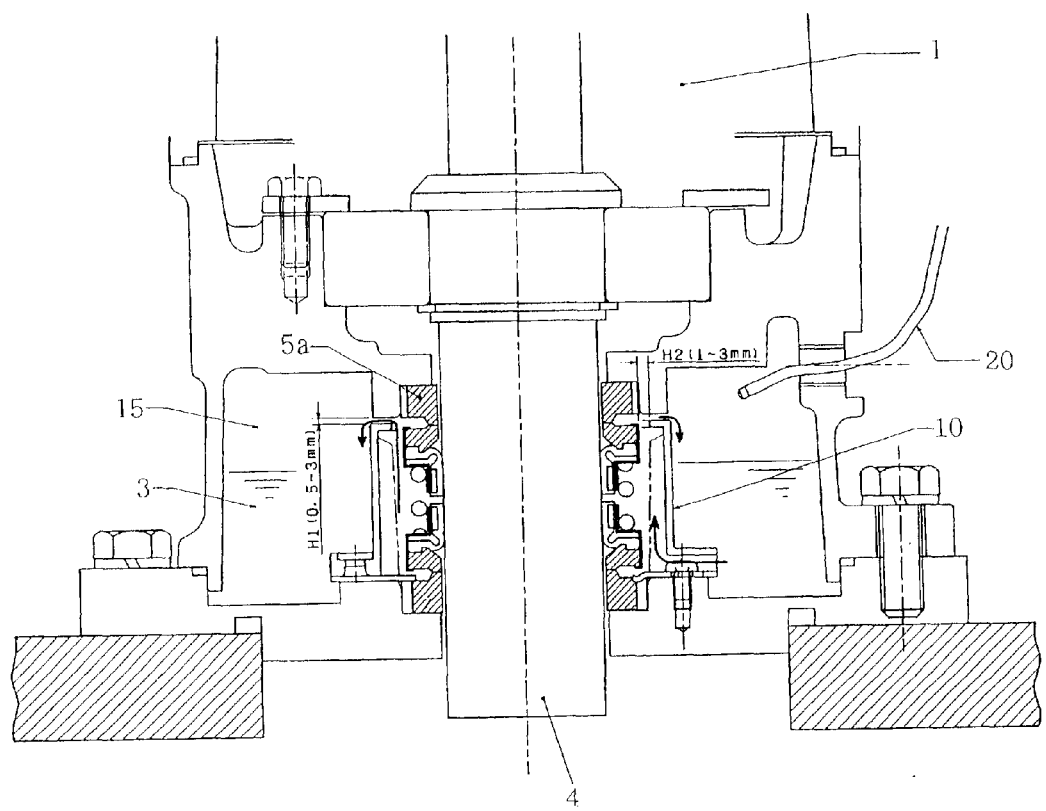
FIG. 11 shows a state in which visual checking was performed by use of a fiber scope in the experiment.

FIG. 10 shows the results of an experiment which was performed in order to evaluate circulation of the lubrication oil, while dimensions $H_1$ and $H_2$ of the main clearances were varied. FIG. 11 shows a setting employed in the experiment.

In the experiment, the motor shaft was rotated at a constant speed of 1800 rpm, and for each combination of $H_1$ and $H_2$ circulation of the lubrication oil was visually checked from the outside of the test apparatus by means of a fiber scope 20.

Evaluation was carried out using the three ratings shown below.

| Status of lubrication oil flowing out of clearance $H_1$ | Evaluation |
| --- | --- |
| ① Lubrication oil flows out uniformly over the entire circumference | ○ |
| ② Lubrication oil does not flow out uniformly over the entire circumference | △ |
| ③ Lubrication oil hardly flows out | x |

As is understood from FIG. 10, the lubrication oil uniformly flows out of the clearance over the entire circumference when $H_1$ is set to fall within the range of about 0.5 mm to 3 mm and $H_2$ is set to fall within the range of about 1 mm to 3 mm.

In order to make smoother the flow of the lubrication oil through the oil outlet 13a, which is a passage in the form of an annular clearance, a guide plate 130 may be provided. As described above, the lubrication oil flowing upward along the guide vanes G lubricates the upper sliding surface 12a and absorbs the sliding heat generated at the sliding surface 12a, and then flows from the inner circumferential edge of the flange F1 to the oil outlet 13a. In order to assist the flow of the lubrication oil more effectively, the guide plate 130 is provided. The guide plate 130 is preferably slanted so as to follow the flow of the lubrication oil.

In a conventional structure having the above-mentioned oil inlet 13b, a force which pushes the lubrication oil to the outside of the cylindrical wall member 10 is produced. In order to effectively obtain an action of sucking and pushing the lubrication oil up, a guide plate 131 may be provided.

In this case, in order to improve circulation of the lubrication oil flowing upward along the guide vanes G, the inclination of the guide plate 131 is preferably set to assist the upward flow along the guide vanes G, as in the case of the guide plate 130 provided at the oil outlet 13a.

When the pump is operated, the lubrication oil within the oil chamber located outside the cylindrical wall member flows into the inner side of the cylindrical wall member trough the oil inlet, whereby the lubrication oil lubricates the lower sliding surface and absorbs heat generated at the sliding surface, while flowing upward along the slanted surfaces of the guide vanes G.

Subsequently, the lubrication oil moves toward the center axis along the back face of the air-catching prevention flange to thereby lubricate the upper sliding surface and absorb the sliding heat generated at the sliding surface. Subsequently, the lubrication oil flows from the inner circumferential edge of the flange and reaches the oil outlet, which is an annular clearance. Within the oil outlet, the lubrication oil forms an oil film to thereby prevent entry of air. Subsequently, the lubrication oil moves to the oil chamber outside the cylindrical wall member.

In the submersible pump according to the present invention, scattering of lubrication oil from the center portion of the oil chamber toward the circumferential wall can be prevented reliably, and, irrespective of variation in rotational speed of the pump shaft, entrapment of air into the lubrication oil can be prevented through formation of an oil film in the oil outlet, so that the lubrication and cooling of the sliding surface are performed effectively.

Moreover, since the lower flange of the cylindrical wall member—which accommodates a mechanism for effecting oil circulation—is fixed to the pump-side housing via an annular holding plate, assembly is simplified, and excellent mechanical stability is attained due to a high degree of flatness of the surface to which the flange is attached.

Industrial Applicability

The lubrication oil retaining apparatus of the present invention can be effectively used in other types of submersible pumps as an apparatus for effectively lubricating and cooling the sliding surface of a shaft seal device disposed within an oil chamber of the submersible pump.

What is claimed is:

1. An apparatus for retaining lubrication oil at the sliding surface of a shaft seal device disposed within an oil chamber of a submersible pump, in which an oil chamber for a mechanical seal is provided between a motor chamber and a pump chamber, the apparatus comprising:

a cylindrical wall member surrounding the shaft seal device;

a guide vane fixed to an inner circumferential surface of the cylindrical wall member;

an oil inlet formed at the lower edge of the cylindrical wall member;

an inwardly-projecting flange provided at the upper edge of the cylindrical wall member located above a sliding surface between an upper mating ring and an upper seal ring, such that the flange is in close proximity to a motor-side housing; and an oil outlet formed between an upper surface of the flange and a lower surface of a circumferential wall which surrounds an annular groove into which the upper mating ring is fitted, wherein, the clearance between the upper surface of the flange provided at the upper edge of the cylindrical wall member and the lower surface of the circumferential wall is set to fall within a range of about 0.5 mm to 3 mm, such that an oil film is formed in the oil outlet to prevent entry of air through the oil outlet, and the clearance between an inner circumferential surface of the flange provided at the upper edge of the cylindrical wall member and an outer circumferential surface of the upper seal ring is set to fall within a range of about 1 mm to 3 mm.

2. An apparatus for retaining lubrication oil at the sliding surface of a shaft seal device disposed within an oil chamber of a submersible pump according to claim 1, wherein a guide plate is provided at the oil inlet or the oil outlet.

* * * * *